US006813862B2

(12) United States Patent  
Perich et al.

(10) Patent No.: US 6,813,862 B2  
(45) Date of Patent: Nov. 9, 2004

(54) CORNER BRACKET ASSEMBLY

(75) Inventors: David C. Perich, North Canton, OH (US); Tony Bouquot, Hudson, OH (US); Robert Maier, Hudson, OH (US); Dave Alan Bina, Northfield Center, OH (US)

(73) Assignee: Patio Enclosures, Inc., Macedonia, OH (US)

( * ) Notice: Subject to any disclaimer, the term of this patent is extended or adjusted under 35 U.S.C. 154(b) by 167 days.

(21) Appl. No.: 10/038,704

(22) Filed: Jan. 3, 2002

(65) Prior Publication Data

US 2003/0123928 A1 Jul. 3, 2003

(51) Int. Cl.[7] .......................... E05D 13/00; E05D 15/00
(52) U.S. Cl. .............................. 49/425; 49/420; 16/91; 16/105; 403/403
(58) Field of Search .......................... 49/425, 410, 409, 49/420, 414; 16/95 R, 97, 91, 100, 46 R, 101, 105; 52/656.9, 657; 403/403, 382, 401, 402; 278/220.1, 298.1

(56) References Cited

U.S. PATENT DOCUMENTS

| | | | | |
|---|---|---|---|---|
| 3,299,575 A | * | 1/1967 | Du Shane | 49/420 |
| 3,386,208 A | * | 6/1968 | Banner | 49/420 |
| 3,619,947 A | | 11/1971 | Burum | |
| 3,716,890 A | | 2/1973 | Benson | |
| 3,729,868 A | * | 5/1973 | Burum | 49/420 |
| 4,006,513 A | * | 2/1977 | Offterdinger | 16/99 |
| 4,030,160 A | | 6/1977 | Lambertz et al. | |
| 4,189,870 A | | 2/1980 | Helmick | |
| 4,353,186 A | * | 10/1982 | Offterdinger | 49/420 |
| 4,397,062 A | | 8/1983 | Huang | |
| 4,502,260 A | | 3/1985 | Machler | |
| 4,639,970 A | * | 2/1987 | Adams | 16/90 |
| 4,805,262 A | | 2/1989 | Marshik | |
| 4,873,741 A | | 10/1989 | Riegelman | |
| 4,899,493 A | | 2/1990 | Baumgarten | |
| 5,119,872 A | | 6/1992 | Engebretson | |
| 5,287,655 A | | 2/1994 | Harvey | |
| 5,343,594 A | | 9/1994 | Harvey | |
| 5,860,189 A | * | 1/1999 | An | 16/91 |
| D411,018 S | | 6/1999 | Nowell | |
| 5,921,051 A | | 7/1999 | Hope | |
| 5,960,605 A | * | 10/1999 | Hope | 52/656.7 |
| 6,067,760 A | | 5/2000 | Nowell | |

* cited by examiner

Primary Examiner—Hugh B. Thompson, II  
(74) Attorney, Agent, or Firm—Fay, Sharpe, Fagan, Minnich & McKee, LLP

(57) ABSTRACT

A corner bracket assembly for use in an associated movable frame assembly is provided. The corner bracket assembly includes a first housing piece having upstanding coupling pins. A second housing piece has receiving pockets for connecting engagement with the coupling pins and defining a cavity therebetween. A roller assembly is received within the cavity. The roller assembly includes a roller housing, a threaded engaging portion defined in the roller housing, and a roller rotatably mounted within the roller housing. A threaded fastener is rotatably mounted between the first and second housing pieces and is in threaded engagement with the roller assembly. A track is defined between the first and second housing pieces and the roller assembly for linearly adjusting a position of the roller assembly in relation to the first and second housing pieces.

24 Claims, 8 Drawing Sheets

CORNER BRACKET ASSEMBLY

BACKGROUND OF THE INVENTION

The present invention relates to a corner bracket assembly. More particularly, the invention relates to a corner bracket assembly for use with an associated frame assembly and will be described with particular reference thereto. However, it is to be appreciated that the present invention may also be amenable for other applications.

It is well known that corner bracket assemblies are used to connect a plurality of elongated frame elements to form a frame assembly of a door sash, window sash, panel, or the like. It is also well known to use rollers with such frame assemblies. Typically, the rollers or roller assemblies are separate from the corner bracket assemblies and are installed into the corner bracket or into the adjacent attached frame member. The rollers are capable of being slidably supported within a track on an associated fixed door frame, window frame, panel frame, or the like. Normally, the rollers are adjustable to accommodate varying fixed frames and to simplify installation of the frame assembly into a fixed frame, as well as removal therefrom. Most known corner brackets do not have the adjustable roller assembly integrated into the design of the corner bracket. The one known assembly which does, does not positively regulate a movement of the bracket assembly via a manually movable member. The known corner brackets also are not as sturdy as desirable. Furthermore, it is desirable to provide corner bracket assemblies having adjustable rollers wherein the strength and integrity of the corner bracket assembly is maintained.

The present invention provides a new and improved corner bracket assembly that overcomes the foregoing difficulties and others and provides the aforementioned advantageous features.

SUMMARY OF THE INVENTION

In accordance with one aspect of the present invention, a new and improved corner bracket assembly for use in an associated frame assembly is provided.

More particularly in accordance with this aspect of the invention, the corner bracket assembly comprises a body, a first leg, and a second leg. The first leg extends from the body and is adapted to be connected to a first frame member of the associated frame assembly. The second leg extends from the body in a direction approximately normal to the first leg and is adapted to be connected to a second frame member of the associated frame assembly. The corner bracket assembly further comprises a roller assembly adjustably secured within at least one of the body, the first leg, and the second leg. The roller assembly is capable of protruding outward a selected distance relative to at least one of the body, the first leg, and the second leg. The roller assembly comprises a roller housing slidably mounted in at least one of the body, the first leg and the second leg. A roller element is rotatably mounted in the roller housing. A threaded member is defined within the roller housing. A fastener has a threaded portion engaged in the threaded member and a head portion extending away from the roller housing.

According to another aspect of the present invention, a new and improved corner fastener is provided for use in forming an associated frame assembly by interconnecting at a predetermined angle elongated tubular members of the associated frame assembly. The tubular members have a hollow internal space of a predetermined cross-sectional area.

More particularly in accordance with this aspect of the invention, the corner fastener comprises a pair of legs oriented at such predetermined angle with respect to each other and connected to a junction member. Each of the legs is adapted for disposition within the interior of a respective one of the associated elongated tubular members and is of such a cross-sectional area as to substantially and securely fill the internal space of the elongated tubular members. The junction member is of such configuration as to be contiguous with the outer walls of the tubular members. An adjustable roller device is slidably mounted in the junction member in order to move along a track defined between the junction member and the roller device. The roller device is selectively moveable to positions between a first protruding position and a second retracted position.

According to still another aspect of the present invention, a corner bracket assembly for use in an associated movable frame assembly is provided.

More particularly in accordance with this aspect of the invention, the corner bracket assembly comprises a first housing piece having upstanding coupling pins. A second housing piece has receiving pockets for connecting engagement with the coupling pins and defining a cavity therebetween. A roller assembly is received within the cavity. The roller assembly includes a roller housing, a threaded engaging portion defined in the roller housing, and a roller rotatably mounted within the roller housing. A threaded fastener is rotatably mounted between the first and second housing pieces and is in threaded engagement with the roller assembly. A track is defined between the first and second housing pieces and the roller assembly for linearly adjusting a position of the roller assembly in relation to the first and second housing pieces.

According to another aspect of the invention, a new and improved corner roller arrangement is provided for each of the corners of a sliding panel of the type including a pair of parallel, elongated spaced side members defining the length of the panel and top and bottom members defining the width of the panel.

More particularly in accordance with this aspect of the invention, the corner roller arrangement comprises a corner member including a frame, and corner keys integral therewith. The corner keys fit into the side, top and bottom panel members whereby the panel members abut the corner member frame for providing a rigid panel frame. The corner member frame has a first side and a second side. The first and second sides are in substantially parallel spaced relation. A roller housing rotatably supports a roller and is displaceably disposed within the corner member frame between the first and second corner member frame sides. The roller housing is selectively moveable to positions between a first protruding position and a second recessed position along a track defined by engaging components of at least one of the roller housing, the first side, and the second side.

According to another aspect of the invention, a new and improved a corner bracket and roller assembly for a sliding panel is provided.

More particularly in accordance with this aspect of the invention, the corner bracket and roller assembly comprises a corner bracket having integral first and second arms extending at approximately right angles and adapted for insertion into associated frame members of an associated panel. The first arm has an aperture in the bottom edge thereof. A roller assembly is disposed within the corner bracket. The roller assembly comprises a housing, a roller, and an adjusting means for moving the roller assembly along a linear path relative to the corner bracket. The roller is rotatably secured within the housing. The path includes a first position wherein the roller assembly protrudes through the aperture and a second position wherein the roller assembly recedes within the aperture. The path is defined by at least one groove and rib engagement.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENT

Figure 1:
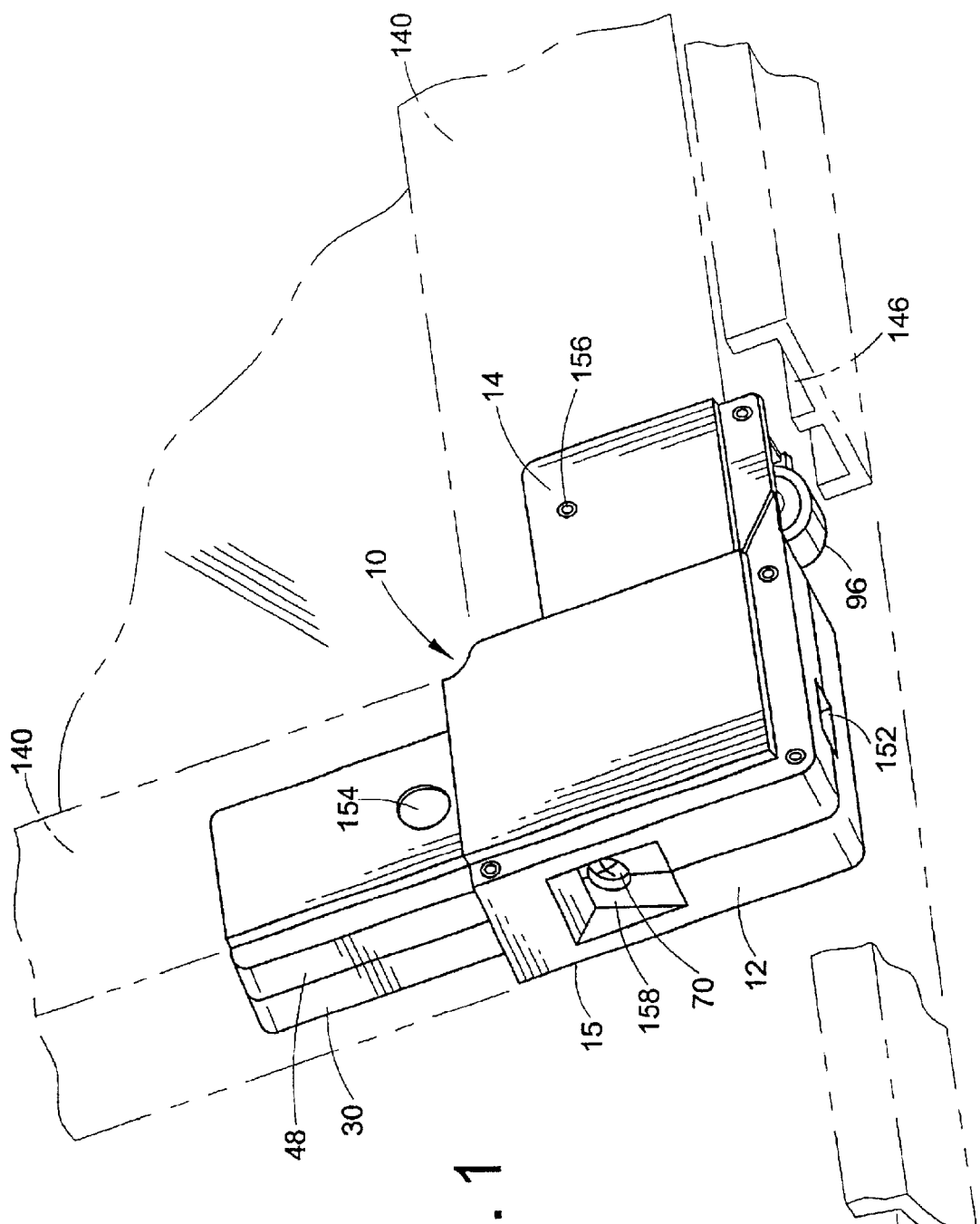
FIG. 1 is a perspective view of a corner bracket assembly according to the present invention as used with elongated frame members of a door or window and a track along which the panel slides.
Figure 6:
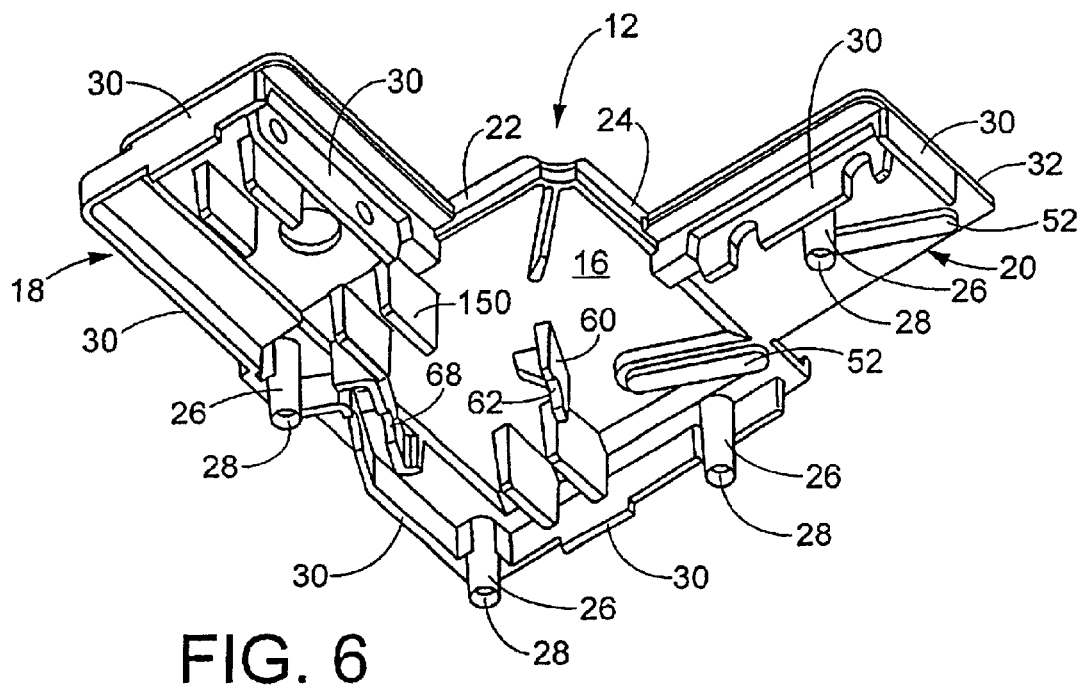
FIG. 6 is a perspective view of a first housing piece of the corner bracket assembly of FIG. 3 showing a cavity side thereof.

Referring now to the drawings wherein the showings are for purposes of illustrating the preferred embodiments of the invention only and not for purposes of limiting the same, FIG. 1 shows a corner bracket assembly 10 comprising a first housing piece 12 and a second, opposing housing piece 14 which together form a housing 15. With reference to FIG. 6, the first housing piece 12 comprises a body portion 16, a first leg portion 18, and a second leg portion 20. The body portion 16 is generally rectangular-shaped. The first leg portion 18 extends from a first side 22 of the body portion 16. The second leg portion 20 extends from a second side 24 of the body portion 16 in a direction approximately normal relative to the first leg portion 18. A plurality of coupling pins 26 extend from a cavity side of the first housing piece 12. Each of the plurality of coupling pins 26 includes a tail 28 (FIG. 4) at a distal end thereof. Additionally, a plurality of first housing walls 30 extend from a perimeter edge 32 of the cavity side.

Figure 5:
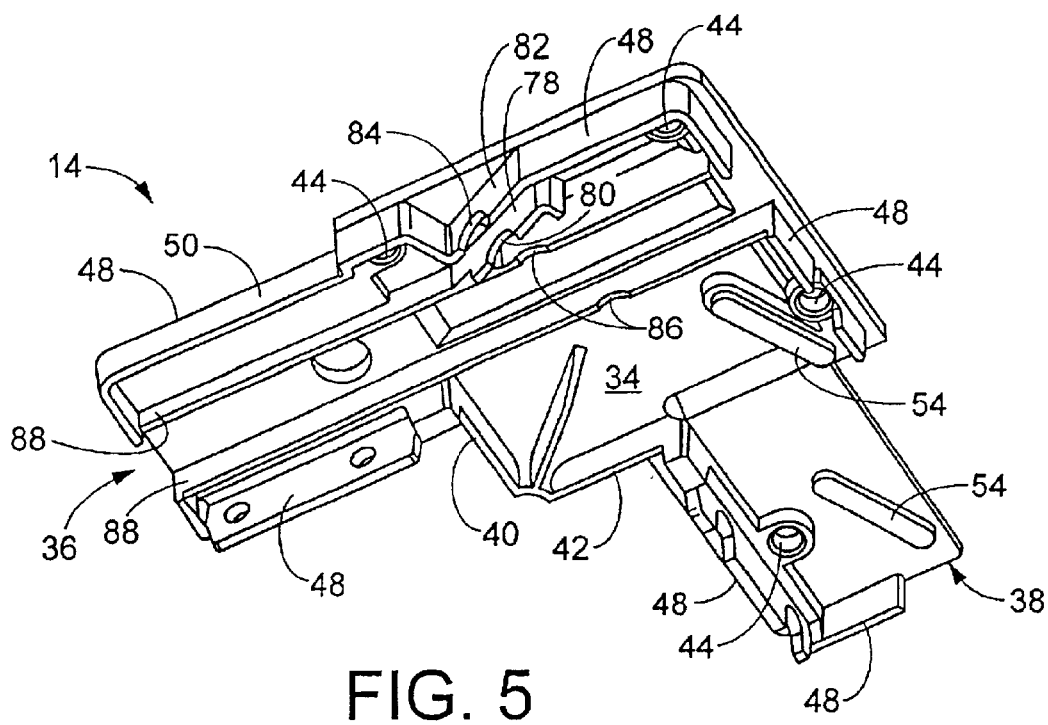
FIG. 5 is a perspective view of a second housing piece of the corner bracket assembly of FIG. 3 showing a cavity side thereof.

With reference to FIG. 5, the second housing piece 14 comprises a body portion 34, a first leg portion 36, and a second leg portion 38, similar to the first housing piece 12. Again, the body portion 34 is generally rectangular-shaped. The first leg portion 36 extends from a first side 40 of the body portion 34. The second leg portion 38 extends from a second side 42 of the body portion 34 in a direction approximately normal relative to the first leg portion 36. A plurality of coupling pockets 44 are defined within the second housing piece 14. A counterbored edge 46 (FIG. 2) is provided around each of the plurality of coupling pockets 44 on an outward side of the second housing piece 14 opposite from the cavity side. Additionally, a plurality of second housing walls 48 extend from a perimeter edge 50 of the cavity side.

With reference to FIG. 1, the first housing piece 12 connects to the second housing piece 14. More specifically, the plurality of first housing walls 30 abuttingly engage the plurality of second housing walls 48. To provide structural integrity and securely connect the housing pieces 12,14 together, the plurality of coupling pins 26 (FIG. 6) are received through the plurality of coupling pockets 44 (FIG. 5). The tails 28 (FIG. 4) of the plurality of coupling pins 26 are staked to the counterbored edges 46 (FIG. 2) of the second housing piece 14 to thereby securely connect the first and second housing pieces 12, 14 together. When connected together, the housing pieces 12, 14 define a cavity therebetween.

With reference again to FIG. 6, a pair of spaced first ridges 52 is disposed on the cavity side of the first housing piece 12. Each of the first ridges 52 is angled relative to the second side 24 of the body portion 16 as shown. Additionally, the first ridges 52 are substantially parallel to one another. A pair of spaced second ridges 54 is disposed on the cavity side of the second housing piece 14, as shown in FIG. 5. Like the first ridges 52, each of the second ridges 54 is angled relative to the second side 42 of the body portion 34 of the second housing piece 14 and the second ridges 42 are substantially parallel to one another.

Figure 4:
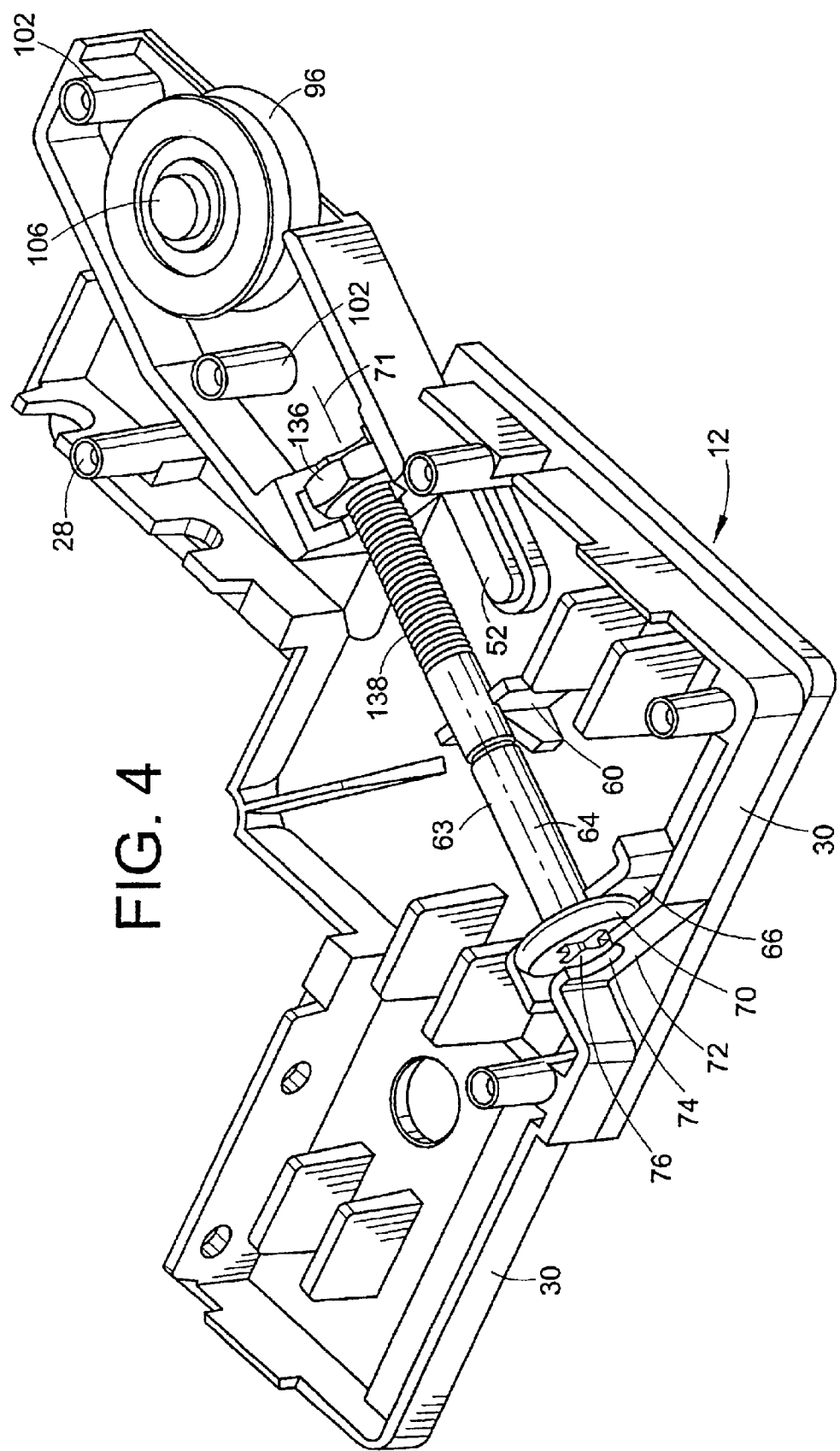
FIG. 4 is an enlarged perspective view of a portion of the corner bracket assembly of FIG. 3.

With reference to FIG. 4, a lower bolt support 60 extends from the cavity side of the first housing piece 12. The lower bolt support 60 includes a radial notch 62 (FIG. 6) for supporting a shaft 63 of a bolt 64. A first upper bolt support 66 also extends from the cavity side of the first housing piece 12. The upper bolt support 66 includes a radial notch 68 (FIG. 6) for supporting the shaft 63 near a head portion 70 of the bolt 64. The first upper bolt support 66 and the lower bolt support 60 are oriented parallel to one another and position an axis 71 of the bolt 64 at an angle substantially parallel to the angle of the first and second ridges 52 and 54.

A first bolt head positioning wall 72 is defined by one of the plurality of first housing walls 30. The bolt head positioning wall 72 includes a radial notch 74 for providing access to a cross-slot 76 defined within the head portion 70 of the bolt 64. Of course, the cross-slot 76 and/or the head portion 70 could be alternatively configured to allow adjustment of the bolt 64 by any of various known methods. For example, the cross-slot 76 could be replaced with a flat-head slot, hex-head slot, etc. Alternatively, the bolt head portion 70 could be replaced with a hex-headed bolt head, a knurled bolt head for toolless rotation, etc. Besides providing access to the bolt 64, the bolt head positioning wall 72, in conjunction with the first upper bolt support 66 and/or the lower bolt support 60, restricts lateral and longitudinal movement of the bolt 64 relative to the first housing piece 12. Only rotational movement is allowed.

With reference to FIG. 5, a second upper bolt support 78 extends from the cavity side of the second housing piece 14. The second upper bolt support 78 includes a radial notch 80 for supporting the bolt 64 (FIG. 4) near the head portion 70 thereof. The second upper bolt support 78 is positioned on the cavity side such that when the housing pieces 12, 14 are connected together, the second upper bolt support 78 contacts the first upper bolt support 66 and traps the bolt 64 therebetween within the radial notches 68,80. A second bolt head positioning wall 82 is defined by one of the plurality of second housing walls 48. Like the first bolt head positioning wall 72, the second bolt head positioning wall 82 includes a radial notch 84 for providing access to the cross-slot 76. Similar to the first housing piece 12, the second bolt head positioning wall 82, in conjunction with the second upper bolt support 78, restricts lateral and longitudinal movement of the bolt 64 relative to the second housing piece 14. On the second housing piece 14, a pair of notches 86 are disposed on respective channel walls 88. The pair of notches 86, the second upper bolt support 78, and the second bolt head positioning wall 82 maintain the position of the bolt 64 in conjunction with the first housing piece supports 60, 66, 72. More particularly, all the supports 60, 66, 72, 78, 82, 86 align the axis of the bolt 64 with the angle of the first and second pairs of ridges 52, 54.

Figure 3:
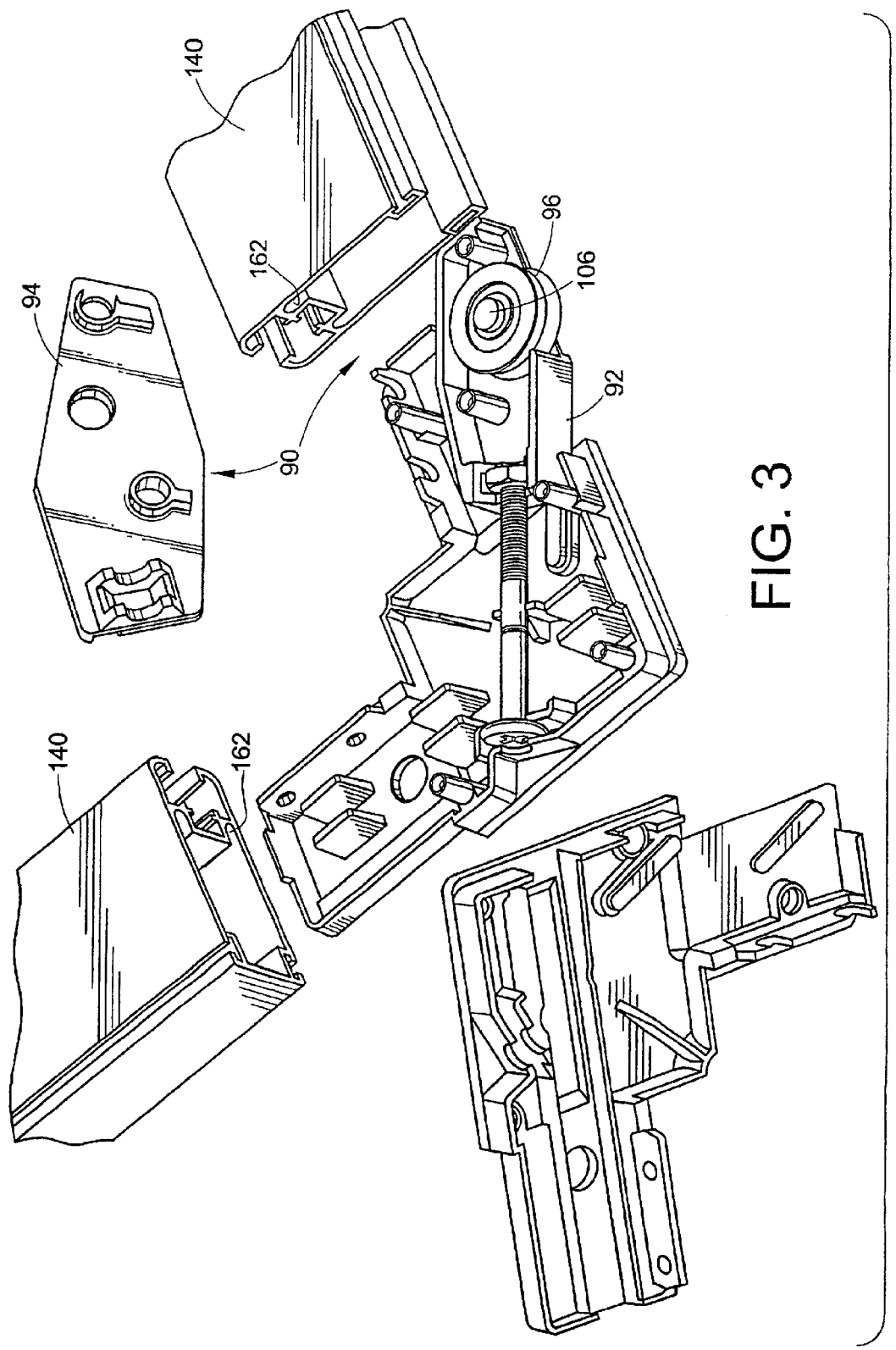
FIG. 3 is an exploded perspective view of the corner bracket assembly and elongated frame members of FIG. 2.
Figure 7:
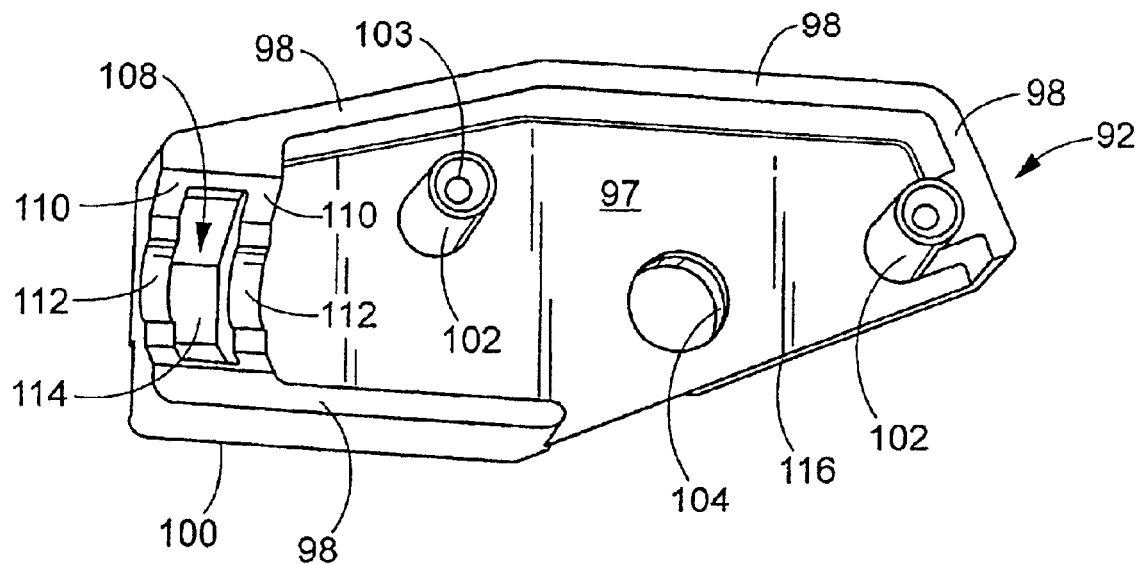
FIG. 7 is a perspective view of a first roller housing piece of the bracket assembly of FIG. 3 showing a cavity side thereof.
Figure 8:
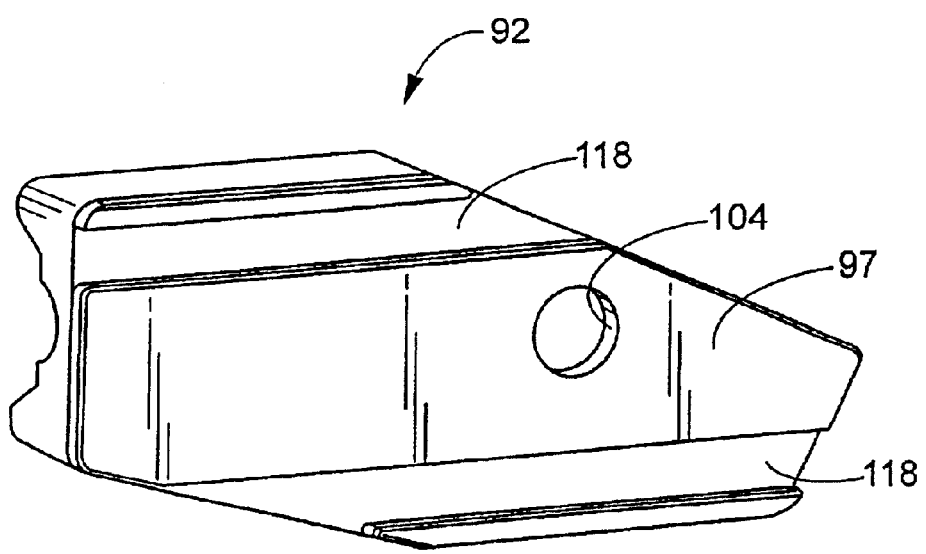
FIG. 8 is a perspective view of the first roller housing piece of FIG. 7 showing a grooved side thereof.

With reference to FIG. 3, a roller assembly 90 is slidably supported in the housing 15. The roller assembly 90 comprises a first roller housing piece 92, a second roller housing piece 94, and a roller 96. With reference to FIG. 7, the first roller housing piece 92 includes a body 97 having a plurality of roller housing walls 98 extending from a perimeter edge 100 of a cavity side thereof. Also, a plurality of coupling pins 102 extend from the cavity side of the body, each having a tail 103. A first axle opening 104 is disposed in a middle portion of the first roller housing piece 92 for receiving one end of an axle 106 (FIG. 3) of the roller 96. At a first end of the first roller housing piece 92, a first nut support member 108 is defined. The nut support member 108 is defined by a set of walls extending from the body 97. Two of these walls are transverse walls 110 and the other two are portions of the housing walls 98. Each of the traverse walls 110 has a radial notch 112 defined therein. Between the notched walls 110 and the opposed portions of the housing walls 98, a first nut pocket 114 is defined. Adjacent a second end of the first roller housing piece 92, a roller edge portion 116 of the perimeter edge 100 is disposed whereon no roller housing wall 98 is provided. With reference to FIG. 8, a pair of first grooves 118 is located within an outward side of the first roller housing piece body 97 wherein the outward side is opposite the cavity side.

Figure 9:
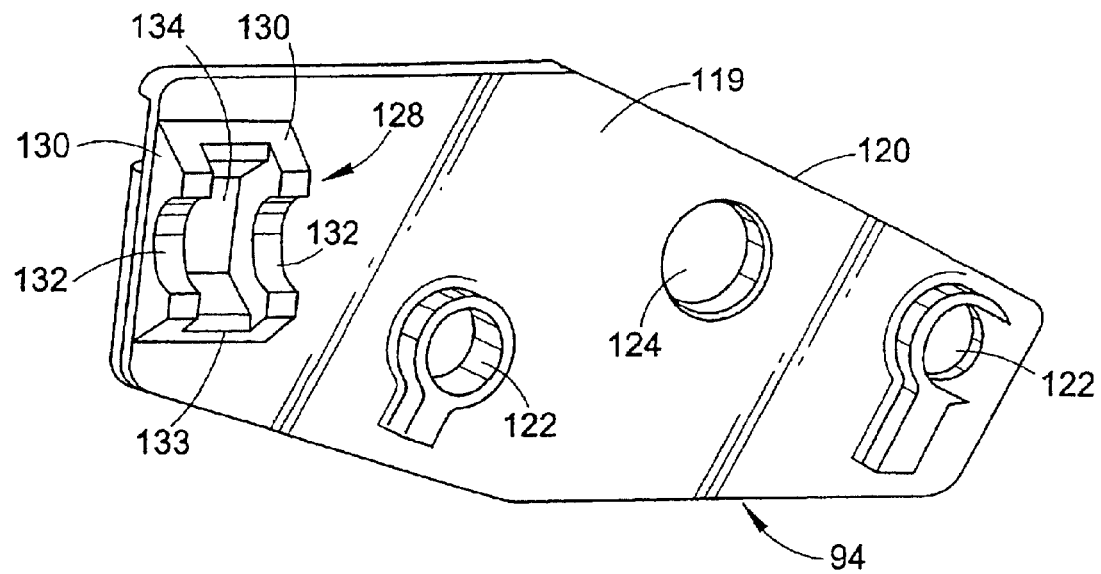
FIG. 9 is a perspective view of a second roller housing piece of the bracket assembly of FIG. 3 showing a cavity side thereof.
Figure 10:
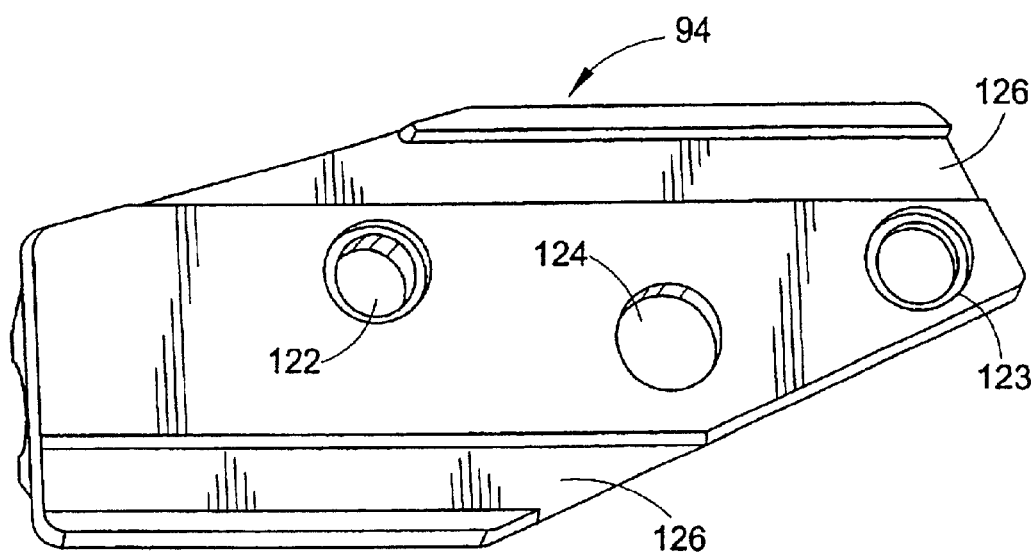
FIG. 10 is a perspective view of the second roller housing piece of FIG. 9 showing a grooved side thereof.

With reference to FIG. 9, the second roller housing piece 94 has a body 119 which is generally planar as it does not have any walls extending from its perimeter edge 120. A plurality of pin pockets 122 are disposed in the second roller housing piece 94 that are capable of receiving the coupling pins 102 of the first roller housing piece 92. Each pin pocket 122 includes a counterbored edge 123 (FIG. 10) on an opposite side of the second roller housing piece 94. A second axle opening 124 is disposed in a middle portion of the second roller housing piece 94 for receiving the other of the axle 106 of the roller 96. At a first end of the second roller housing piece 94, a second nut support member 128 is provided. The second nut support member 128 comprises a pair of substantially parallel walls 130, each having a radial notch 132 defined therein. A pair of stub walls 133 connect the extension walls 130. A second nut pocket 134 is defined between the extension walls 130 and the stub walls 133. The extension walls 130 are capable of interconnecting within the notched walls 110 of the first roller housing piece 92. With reference to FIG. 10, a pair of second grooves 126 is defined within an outward side of the second roller housing piece 94.

To assemble the roller assembly 90, the second roller housing piece 94 is connected to the first roller housing piece 92 with a nut 136 (FIG. 4) and the roller 96 sandwiched therebetween. More particularly, with reference to FIG. 4, one end of the axle 106 of the roller 96 is positioned in the first axle opening 104 (FIG. 7) of the first roller housing piece 92. The nut 136 is received in the nut pocket 114 of the first roller housing piece 92 between the notched walls 110. The second roller housing piece 94 (FIG. 10) is connected to the first roller housing piece 94 by aligning the pin members 102 with the pin receiving recesses 122 (FIG. 10), the other of the axial support members 106 with the second axle opening 124 (FIG. 10) of the second roller housing piece 94, and the extension walls 132 (FIG. 9) with the notched walls 110. The tails 103 of the pin members 102 are staked such that the pin members 102 are securely connected to the counterbored edges 123 of the second roller housing piece 94. In this arrangement, the nut 136 and the roller 106 are secured in the roller assembly 90. With additional reference to FIG. 2, the position of the first and second axle openings 104, 124 causes the roller 106 to extend outwardly from the first and second roller housing pieces 92,94 adjacent the roller edge portion 116 of the first roller housing piece 92. The grooves 118,126 of the roller housing pieces 92,94 are parallel to one another and are aligned on the outward sides of the roller housing assembly 90.

To assemble the housing 15, the bolt 64 is positioned within the upper and lower bolt supports 60, 66 of the first housing piece 12 with the head portion 70 positioned between the upper bolt support 66 and the first bolt head positioning wall 72. The second housing piece 14 is connected to the first housing piece 12. More particularly, the coupling pockets 44 of the second housing piece 14 are aligned with the coupling pins 26 of the first housing piece 12. The tails 28 of the coupling pins 26 are staked such that the coupling pins 26 are securely connected to the counterbored edges 46 (FIG. 2) of the second housing piece 14 thereby forming the housing 15.

The roller assembly 90 can then be installed in the housing 15. More particularly, the grooves 118,126 of the roller assembly are aligned with the ridges 52, 54 of the housing 15 during which the roller 96 is positioned away from the housing 15. The alignment of the grooves 118, 126 with the ridges 52, 54 causes the bolt 64 to be aligned with a bolt recess created by the outermost radial notches 112, 132 of the roller housing assembly 90. The bolt 64 can be rotated to threadingly engage the nut 136 thereby securing the roller housing assembly within the housing 15. In an alternative embodiment, the corner bracket assembly 10 can be assembled without the roller assembly 90 and used alone as a simple corner bracket where the roller feature is not desired, such as the top corners of a window sash. Of course, a corner bracket assembly 10 with the roller assembly 90 may be used on the same sash or panel as a corner bracket assembly 10 without the roller assembly. For example, a pair of corner brackets 10 with roller assemblies 90 could be used on bottom corners of a sash while a pair of corner brackets 10 without roller assemblies 90 could be used on top corners of the sash.

To adjust the roller 96 of the corner bracket assembly 10, the bolt 64 is rotated in a first direction thereby extending the roller 96 outward relative to the housing pieces 12, 14 and in a second, reverse direction to retract the roller 96 inward relative to the housing pieces 12, 14. The angle of the bolt 64 in the corner bracket assembly 10 ergonomically positions the bolt 64 for adjustment. More particularly, rotation of the bolt 64 in the first direction causes the roller assembly 90 to move in a direction of the axis 71 of the bolt 64 as a threaded portion 138 (FIG. 4) of the bolt 64 acts against the nut 136. The roller 96 is allowed to protrude outward from the first and second housing pieces 12, 14 because none of the plurality of walls 30, 48 obstruct movement of the roller assembly 90. The roller assembly 90 is guided during movement by a track comprised of the ridges 52, 54 of the first and second housing pieces 12, 14 engaged with the grooves 118, 126 of the first and second roller housing pieces 92, 94. Thus, the roller assembly 90 slidably moves along the track.

When the bolt 64 is rotated in the first direction, the roller housing assembly 90 moves outwardly, relative to the housing 15. Additionally, the track provides improved strength characteristics to the corner bracket assembly 10 because the groove and ridge engagement defines a rigid structure capable of resisting an upward force applied to the roller 96, particularly when the upward force applied is parallel to the first leg portions 18, 36. In a similar manner, rotation of the bolt 64 in the second, reverse direction causes the roller housing assembly 90 to retract into the cavity of the housing pieces 12, 14 along the track. As best shown in FIG. 1, the cross-slot 76 of the bolt 64 remains accessible for adjustment of the roller assembly 90.

Figure 2:
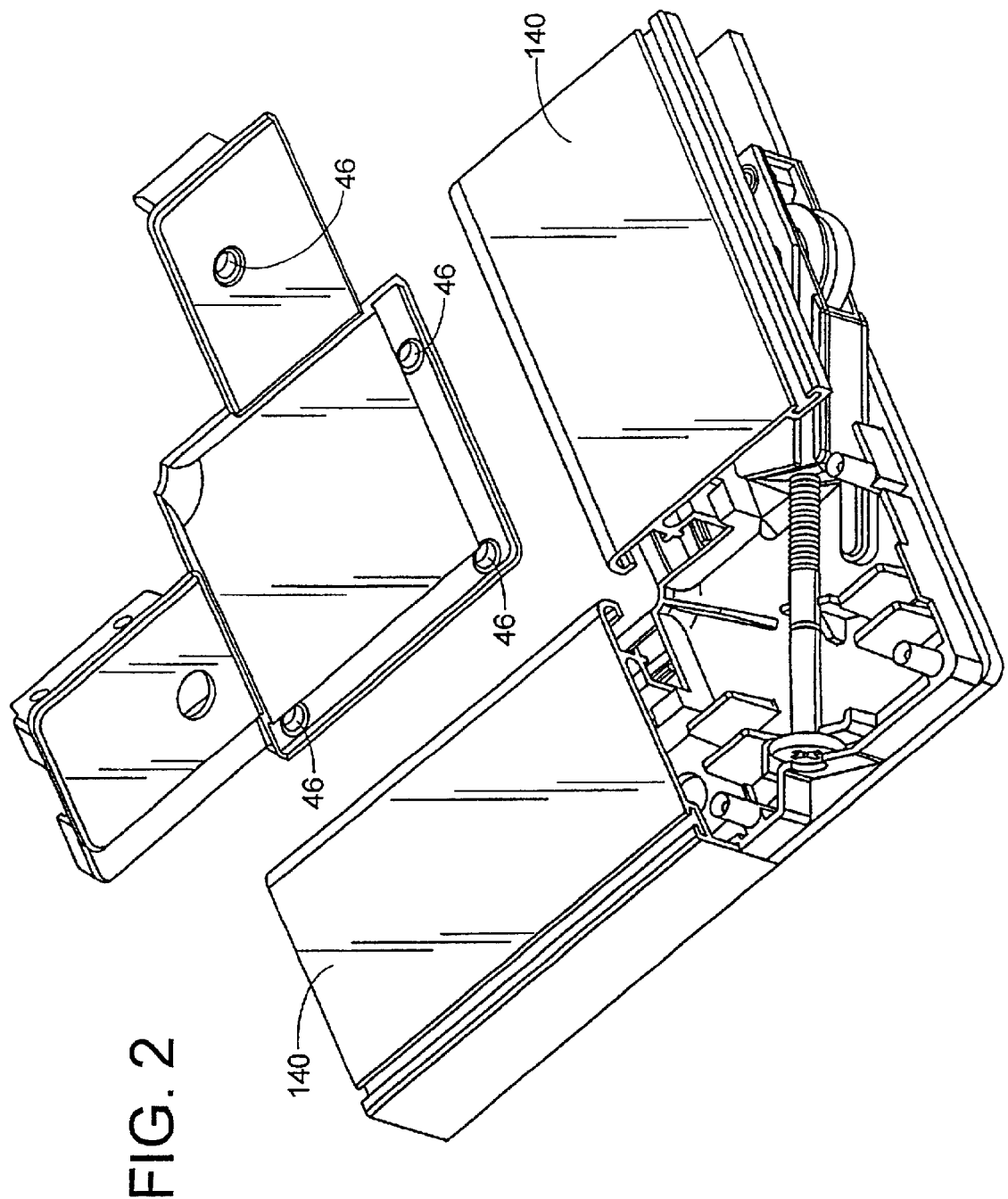
FIG. 2 is a perspective view of the corner bracket assembly of FIG. 1 connected to elongated frame members, wherein a second housing piece is shown removed.
Figure 11:
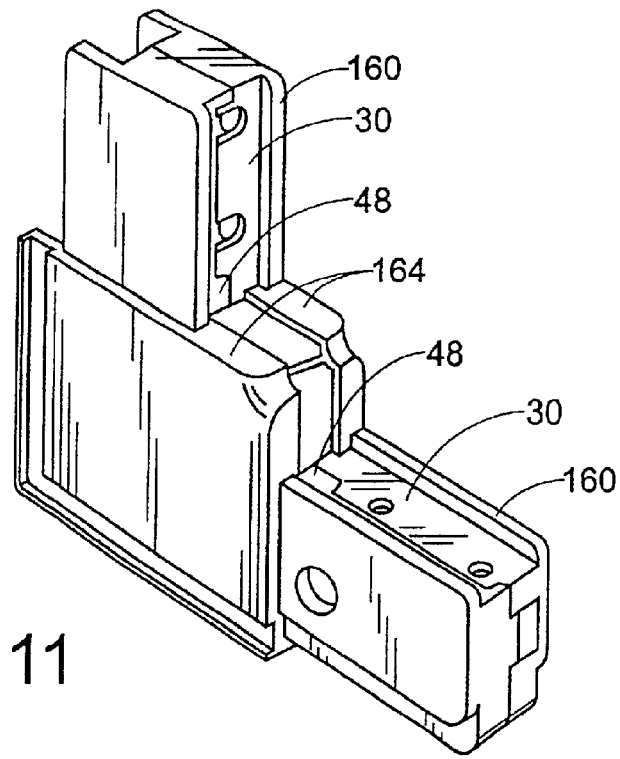
FIG. 11 is a perspective view of the corner bracket assembly of FIG. 1 showing window pane supports thereon.

With reference to FIGS. 2 and 3, the corner bracket assembly 10 can be used with a frame assembly comprising a plurality of elongated members 140 and at least one pane of glass (not shown) or a screen. The frame assembly can be that of a door, window, panel or the like. The elongated members 140 generally have an internal cross-section that interconnects with the exterior cross-sections of the leg portions 18, 20, 36, 38 of the corner bracket assembly 10. With additional reference to FIG. 11, flanges 160 protrude from the corner bracket assembly 10 for engaging flange receiving grooves 162 (FIG. 3) on the elongated members 140. As shown in FIG. 11, portions of the first and second housing walls 30, 48 form pane supports 164. The pane supports 164 extend inwardly toward one another and are adapted to receive and support the at least one pane of glass. In FIG. 11 the supports 164 are meant to hold an uninsulated double glass construction. With reference again to FIG. 1, the roller 96 is mounted in a track 146 that lies beneath the door, window or similar panel.

With reference again to FIG. 6, the first housing piece 12 also comprises a plurality of spaced ribs 150. The ribs define a path for accommodating a locking bar (not illustrated) of the door or window. The locking bar extends out the bottom of the bracket assembly 10 through an aperture 152 (FIG. 1) defined therein. Suitable apertures such as at 154 (FIG. 1) are defined in the second housing piece for accommodating fasteners (not illustrated) for allowing the bracket assembly to be secured to the frame members 140. A staked opening is illustrated at 156. An indentation 158 is defined in the side wall of the bracket to allow access to the head portion 70 of the bolt or similar fastener that regulates the positioning of the housing for the roller 96.

Figure 12:
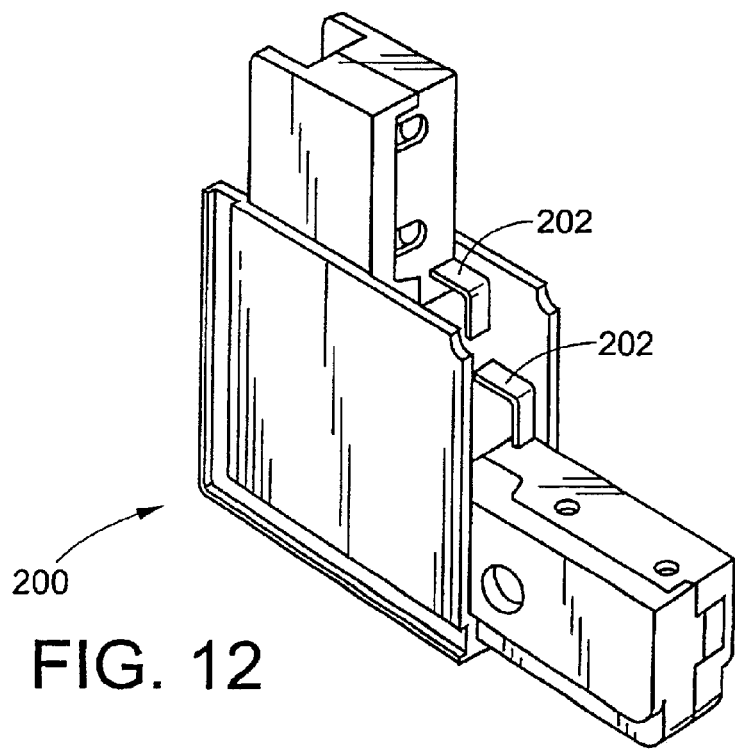
FIG. 12 is a perspective view of a corner bracket assembly according to a second preferred embodiment showing insulated window pane supports thereon.

With reference to FIG. 12, a corner bracket assembly 200 is shown according to a second preferred embodiment of the present invention. In most aspects, the corner bracket assembly 200 is similar to the corner bracket assembly 10. However, the corner bracket assembly 200 is for use with an insulated glass construction wherein two more widely separated panes of glass (not shown) are held in place between a plurality of elongated members (not shown) and a plurality of other corner bracket assemblies 200. A layer of gas, such as argon gas, is used to separate the panes of glass and provide an insulating function. The elongated members used in such an insulated glass application do not have flange receiving grooves 162 so the corner bracket assembly 200 is without flanges 160. Further, the pane supports 164 are replaced by opposing sets of pane supports 202 for the insulated pane construction. Each set of insulated pane supports 202 supports one of the two panes of glass used in the insulated pane construction.

The invention has been described with reference to the preferred embodiments. Obviously, modifications and alterations will occur to others upon reading and understanding the preceding detailed description. It is intended that the invention be construed as including all such modifications and alterations insofar as they are within the scope of the appended claims or the equivalents thereof.

Having thus described the preferred embodiments, the invention is now claimed to be:

1. A corner bracket assembly for use in an associated frame assembly comprising:
    a body;
    a first leg extending from the body and adapted to be connected to a first frame member of the associated frame assembly;
    a second leg extending from the body in a direction approximately normal to the first leg and adapted to be connected to a second frame member of the associated frame assembly; and
    a roller assembly adjustably secured within at least one of the body, the first leg, and the second leg, and capable of protruding outward a selected distance relative to at least one of the body, the first leg, and the second leg, wherein the roller assembly comprises:
        a roller housing slidably mounted in at least one of the body, the first leg and the second leg;
        a roller element rotatably mounted in the roller housing;
        a threaded member defined within the roller housing; and
        a fastener having a threaded portion engaged in the threaded member and a head portion extending away from the roller housing wherein rotation of said fastener in a first direction causes said roller housing to slide in a linear direction in relation to said at least one of the body, the first leg and the second leg.

2. The corner bracket assembly of claim 1 further comprising a groove defined in one of the roller housing and at least one of the body, the first leg, and the second leg and a rib defined in another of said roller housing and at least one of the body, the first leg and the second leg, the groove and the rib cooperating to define an axis of movement along which the roller housing moves in relation to the body.

3. The corner bracket assembly of claim 2 wherein a slot extends between an opening located on an end surface of the second leg, longitudinally through the second leg and the body, to another opening located on a side surface of the body located adjacent the first leg.

4. The corner bracket assembly of claim 2 wherein the groove and the rib cooperate to mount the roller housing assembly in the at least one of the body, the first leg and the second leg so as to resist forces acting thereon.

5. The corner bracket assembly of claim 1 wherein the roller housing fastener head portion is accessible through an opening defined in at least one of the body, the first leg, and the second leg.

6. The corner bracket assembly of claim 1 wherein the roller assembly is positioned at an angle relative to the body such that the roller protrudes outward of the first leg and a side of the body adjacent the first leg, and wherein the fastener is accessible on a side of the body adjacent the second leg.

7. A corner bracket assembly for use in an associated frame assembly comprising:
  a body;
  a first leg extending from the body and adapted to be connected to a first frame member of the associated frame assembly;
  a second leg extending from the body in a direction approximately normal to the first leg and adapted to be connected to a second frame member of the associated frame assembly; and
  a roller assembly adjustably secured within at least one of the body, the first leg, and the second leg, and capable of protruding outward a selected distance relative to at least one of the body, the first leg, and the second leg, wherein the roller assembly comprises:
    a roller housing slidably mounted in at least one of the body, the first leg and the second leg the roller housing including opposed grooves for engaging corresponding opposed ridges protruding from interior surfaces of at least one of the body, the first leg, and the second leg to guide the roller assembly during movement;
    a roller element rotatably mounted in the roller housing;
    a threaded member defined within the roller housing; and
    a fastener having a threaded portion engaged in the threaded member and a head portion extending away from the roller housing.

8. A corner fastener for use in forming an associated frame assembly by interconnecting at a predetermined angle elongated tubular members of the associated frame assembly, the tubular members having a hollow internal space of a predetermined cross sectional area, the corner fastener comprising:
  a pair of legs oriented at a predetermined angle with respect to each other and connected to a junction member, each of the legs being adapted for disposition within the interior of a respective one of the associated elongated tubular members and being of a cross sectional area so as to substantially and securely fill the internal space of the elongated tubular members, the junction member being of a configuration so as to be contiguous with outer walls of the tubular members and forming aligned walls therewith; and
  an adjustable roller device slidably mounted in the junction member in order to move linearly along a track defined between the junction member and the roller device, the roller device being selectively moveable to positions between a first protruding position and a second retracted position.

9. The corner fastener of claim 8 wherein the adjustable roller device comprises a roller housing which rotatably secures a roller, the roller housing being received within at least one of the junction member and the pair of legs.

10. The corner fastener of claim 9 wherein the roller housing includes one of grooves and ribs for engagement with a cooperating one of grooves and ribs defined in the at least one of the junction member and the pair of legs.

11. The corner fastener of claim 8 wherein the adjustable roller device is movable in relation to the junction member by a threaded fastener, the threaded fastener being in threaded engagement with the roller device and constrained from transverse movement by the junction member, upon rotation of the threaded fastener.

12. The corner fastener of claim 8 wherein at least one of the junction member and the pair of legs includes protrusions for guiding the roller device during its movement.

13. A corner bracket assembly for use in an associated movable frame assembly comprising:
  a first housing piece having upstanding coupling pins;
  a second housing piece having receiving pockets for connecting engagement with the coupling pins and defining a cavity therebetween;
  a roller assembly received within the cavity, the roller assembly including a roller housing, a threaded engaging portion defined in the roller housing, and a roller rotatably mounted within the roller housing;
  a threaded fastener rotatably mounted between the first and second housing pieces and in threaded engagement with the roller assembly; and
  at least one sloped track defined between the first and second housing pieces and between one of the first and second housing pieces and the roller assembly, the threaded fastener selectively and linearly adjusting a position of the roller assembly in relation to the first and second housing pieces along the at least one track.

14. The corner bracket assembly of claim 13 wherein the threaded engagement portion comprises a threaded nut mounted in the roller housing.

15. The corner bracket assembly of claim 13 wherein the at least one track includes guide members mounted on at least one of the first and second housing pieces and the roller assembly and protruding into the cavity for engagement with grooves defined on another of the first and second housing pieces and the roller housing, the guide members and grooves defining the at least one track along which the roller assembly moves.

16. The corner bracket assembly of claim 13 wherein the first and second housing pieces together define an opening to the cavity through which the threaded fastener is accessible for rotation.

17. The corner bracket assembly of claim 13 wherein the roller housing comprises:
  a first roller housing member having a first side wall, a plurality of connecting walls extending upwardly from the first side wall, a plurality of coupling pins, a first roller recess, and a first mounting area for receiving the threaded engaging portion;
  a second housing member having a second side wall in abutting contact with the plurality of connecting walls of the first side wall, a second mounting area for receiving the threaded engaging portion, a second roller recess, and a plurality of receiving pockets for engaging the coupling pins of the first side wall; and
  wherein the first and second receiving areas mount the threaded engaging portion and the first and second roller recesses receive respective ends of an axle of a roller for rotatably supporting the roller.

18. The corner bracket assembly of claim 13 wherein the first and second housing pieces together define a channel through the cavity.

19. The corner bracket assembly of claim 18 wherein the second housing piece includes a pair of opposing notches and a pair of channel walls extending into the cavity from the second housing piece, the notches combine with the first housing piece to define recesses into the cavity.

20. The corner bracket assembly of claim 19 wherein the first housing piece includes a plurality of channel supports extending into the cavity from the first housing piece along the length of the channel.

21. A corner roller arrangement for each of the corners of a sliding panel including a pair of parallel, elongated spaced side members defining the length of the panel and top and bottom members defining the width of the panel, said corner roller arrangement comprising:

a corner member including a frame and corner keys integral therewith, the corner keys fitting into the side, top and bottom panel members whereby said panel members abut the corner member frame for providing a rigid panel frame, the corner member frame having a first side and a second side, the first and second sides being in substantially parallel spaced relation; and a roller housing rotatably supports a roller and is displaceably disposed within the corner member frame between the first and second corner member frame sides, the roller housing being selectively moveable along a track to positions between a first protruding position and a second retracted position, said track including guide members mounted on at least one of the roller housing, the first side, and the second side of the corner member frame and protruding into a cavity defined between the first and second sides thereof for engagement with grooves defined on another of the roller housing, and the corner member frame first side and second side, the guide members and grooves defining the track along which the roller housing moves.

22. The corner roller arrangement of claim 21 further comprising a threaded member threadingly engaged with the roller housing wherein rotation of the threaded member selectively moves the roller housing between the first and second positions.

23. A corner bracket and roller assembly for a sliding panel comprising:

a corner bracket having integral first and second arms extending at approximately right angles and adapted for insertion into associated frame members of an associated panel, the first arm having an aperture in the bottom edge thereof; and a roller assembly disposed within the corner bracket comprising:

a housing, a roller rotatably secured within the housing, and an adjusting means for selectively moving the roller assembly along a linear path between a first position wherein the roller assembly protrudes through the aperture and a second position wherein the roller assembly recedes within the aperture, said path being defined by at least one sloped groove and sloped rib which are in slidable engagement with each other, the path being located between the corner bracket and the roller assembly.

24. The corner bracket and roller assembly of claim 23 wherein the at least one groove and rib engagement comprises at least one groove defined in one of the roller housing assembly and the corner bracket and at least one corresponding rib defined in another of the roller housing assembly and the corner bracket, the groove and corresponding rib cooperating to define an axis of movement along which the roller housing moves.

* * * * *